United States Patent [19]

Lückoff et al.

[11] Patent Number: 5,505,921
[45] Date of Patent: Apr. 9, 1996

[54] PROCESS FOR THE PRODUCTION OF $H_2O_2$ FROM THE ELEMENTS

[75] Inventors: Udo Lückoff, Hattersheim; Heinrich Paucksch, Berg; Gerhard Luft, Mühltal-Traisa, all of Germany

[73] Assignee: Solvay Interox, Brussels, Belgium

[21] Appl. No.: 353,253

[22] PCT Filed: Dec. 9, 1993

[86] PCT No.: PCT/EP92/00436

§ 371 Date: Nov. 17, 1993

§ 102(e) Date: Nov. 17, 1993

Related U.S. Application Data

[63] Continuation of Ser. No. 108,581, Nov. 17, 1993, abandoned.

[30] Foreign Application Priority Data

Mar. 5, 1991 [DE] Germany .......................... 41 07 017.8
Aug. 23, 1991 [DE] Germany .......................... 41 27 918.2

[51] Int. Cl.⁶ .................................................. C01B 15/01
[52] U.S. Cl. .................................................. 423/584
[58] Field of Search ...................................... 423/584

[56] References Cited

U.S. PATENT DOCUMENTS

| | | | |
|---|---|---|---|
| 3,361,533 | 1/1968 | Hooper | 423/584 |
| 3,839,192 | 10/1974 | Hayes | 208/139 |
| 4,009,252 | 2/1977 | Izumi et al. | 423/584 |
| 4,048,096 | 9/1977 | Bissot | 252/430 |
| 4,279,883 | 7/1981 | Izumi et al. | 423/584 |
| 4,393,038 | 7/1983 | Sun et al. | 423/584 |

FOREIGN PATENT DOCUMENTS

| | | |
|---|---|---|
| 0274830 | 7/1988 | European Pat. Off. . |
| 0325132 | 7/1989 | European Pat. Off. . |
| 0342047 | 11/1989 | European Pat. Off. . |
| 2603578 | 3/1988 | France . |

*Primary Examiner*—Wayne Langel
*Attorney, Agent, or Firm*—Nikaido, Marmelstein, Murray & Oram

[57] ABSTRACT

The present invention concerns a process for the production of hydrogen peroxide by reacting a gas mixture which contains hydrogen and oxygen in an aqueous reaction medium containing less than 2% by volume liquid organic components and in the presence of a metallic catalyst which is characterized in that a palladium/gold alloy with 5 to 95 atom percent gold or a palladium/iridium or palladium/rhodium bimetal with 1 to 15 atom percent iridium or rhodium is used as the catalyst.

26 Claims, No Drawings

PROCESS FOR THE PRODUCTION OF $H_2O_2$ FROM THE ELEMENTS

This application is a continuation of application Ser. No. 08/108,581 filed Nov. 17, 1993 now abandoned.

DESCRIPTION

The invention concerns a process for the production of hydrogen peroxide by reacting hydrogen and oxygen in aqueous suspension in the presence of a catalyst.

Hydrogen peroxide is used in large amounts in industry e.g. to bleach wood, textiles, paper, oils, fats, to produce bleaching agents for the detergent industry and in particular sodium perborate, and for cleansing agents and cosmetics, to bleach hair, as starting product for epoxides, peroxide catalysts, glycerol, plasticizers, alkyl and acyl peroxide, peroxocarboxylic acids, for disinfection and to an increasing extent in the field of environmental protection to detoxify and deodorize water, waste water and waste air, to bleach pulp, deink waste papter, to desulphurize flue gas, to clean Si chips in the electronic industry etc.

Since it can be used in a great variety of ways and is important in industry, the production processes for hydrogen peroxide is therefore becoming increasingly important. The usual industrial processes for the production of hydrogen peroxide are based on oxidation processes using isopropanol and on autoxidation processes using anthraquinones.

Various methods for the direct synthesis of hydrogen peroxide from hydrogen and oxygen have also already been proposed.

EP-B 0 049 806 describes a process for the direct synthesis of hydrogen peroxide using a palladium supported catalyst in a liquid medium which is comprised of methanol and contains up to 1% by weight formaldehyde.

According to EP-B 0 117 306 an acidic aqueous solution which contains an oxygen-containing organic compound is used in the presence of a palladium catalyst.

A process for the direct synthesis from hydrogen and oxygen is known from U.S. Pat. No. 4,336,239 which is carried out in an acidic aqueous solution containing methanol or acetone in the presence of a supported catalyst with a platinum metal e.g. palladium as the catalytically active metal.

A process is known from EP-B 0 049 809 for the direct synthesis of hydrogen peroxide by contacting a gas mixture containing hydrogen and oxygen with an acidic aqueous liquid which contains up to 95% by volume of a ketone, aldehyde or alcohol in which the formation of hydrogen peroxide takes place on a supported catalyst and detached palladium salts are removed for example by an ion exchange resin in order to prolong the effective life-span of the catalyst and to inhibit the decomposition of the hydrogen peroxide formed.

A disadvantage of the aforementioned processes is the use of organic substances as a component of the liquid reaction medium.

When organic substances are present this is associated with the possibility that organic peroxides may be formed which can lead to a high inflammability of the solvents used and the formation of explosive mixtures with hydrogen peroxide (cf. e.g. Schumb et al., Hydrogen Peroxide, Reinhold Publishing Corporation, 179 (1955); Swern, Organic Peroxides, Wiley—Interscience New York, 26 (1970)2). By this means the possibility of danger considerably increases when direct syntheses are carried out in this manner.

With regard to carrying out the procedure more safely and the purification of the hydrogen peroxide which formed it is more advantageous to carry out the direct synthesis from hydrogen and oxygen in an aqueous medium which is as free as possible of organic components.

Such a process is described in EP-A 0 132 294 in which a commercially available or in situ generated palladium supported catalyst is used in an aqueous reaction medium which is essentially free of organic components and in which the hydrogen ion and chloride ion concentration is between 0.01 and 2 mol/l. The reaction is carried out at a total pressure of up to 100 bar.

A similar process is known from EP-A 0 274 830 in which the aqueous reaction medium contains sodium bromide and sulphuric acid whereby the use of bromide ions yields better results compared to the use of chloride ions at the same concentration with regard to selectivity and yield. Supported catalysts which are coated with palladium/platinum bimetals can also be used instead of palladium supported catalysts (cf. EP-A 0 342 048).

A process for the production of hydrogen peroxide is known from U.S. Pat. No. 4,393,038 in which hydrogen is passed through a palladium-containing membrane into an aqueous solution which contains stabilizing ions in addition to dissolved oxygen; a gold/palladium tube is for example used as the palladium-containing membrane.

DE-B 26 55 920 describes a process for the production of hydrogen peroxide by reacting hydrogen with oxygen in the presence of a catalyst from the platinum group, which must contain a certain amount of adsorbed hydrogen, in an aqueous medium in the presence of hydrochloric acid and phosphoric acid. Alloys or mixtures of the platinum metals with other metals such as gold are also mentioned as catalysts. However, only the use of a palladium-silicic acid catalyst is disclosed. The catalyst is used in a colloidal form or on a support and a hydrogen peroxide concentration of 8 to 11% by weight is maintained in the outflow.

EP-A 0 366 419 discloses a process for the production of hydrogen peroxide by reacting hydrogen and oxygen in an acidic aqueous medium. In this process at least one metal from group VIII on a hydrophobic support is used as the catalyst, wherein Pt, Pd, Ru, Rh and Ir are preferred. However, only the use of a platinum-carbon catalyst is disclosed. In addition the reaction medium contains 0.03 mol/l halogenide ions.

EP-A 0 415 448 discloses a process for the production of hydrogen peroxide by the catalytic reaction of hydrogen with oxygen in a liquid aqueous reaction medium in which metals of the Pt group, in particular platinum and palladium, are either used alone or on a solid support. Palladium-active charcoal and colloidal palladium are disclosed as the catalysts.

Although the use of an aqueous medium which contains no organic components can avoid problems associated with the use of organic components, the use of the above-mentioned aqueous systems with palladium or platinum catalysts and with a relatively high content of acids or/and halogenides is also not satisfactory with regard to the apparative requirements, the attendant environmental pollution and in particular also with regard to their effect of decreasing the stability of the hydrogen peroxide formed.

The object of the present invention is therefore to provide a process for the production of hydrogen peroxide by the direct reaction of hydrogen and oxygen in which the aforementioned disadvantages can be avoided to a large extent and which can be carried out easily and with a high degree of safety.

In particular it is intended to provide a process for the production of hydrogen peroxide from the elements with which it is possible to increase the rate of formation, selectivity or/and yield of hydrogen peroxide compared to methods of the state of the art.

The object according to the present invention is achieved by a process for the production of hydrogen peroxide by reacting a gas mixture which contains hydrogen and oxygen in an aqueous reaction medium containing less than 2% by volume liquid organic components and in the presence of a metallic catalyst which is characterized in that a palladium/ gold alloy with 5 to 95 atom percent gold or a palladium/ iridium or palladium/rhodium bimetal with 1 to 15 atom percent iridium or rhodium is used as the catalyst.

The aqueous reaction medium contains less than 2% by volume, preferably less than 0.5% by volume liquid organic components. It is particularly preferred that the reaction medium is completely free of organic components.

The reaction medium preferably contains less than 0.01 mol/l halogenide ions, particularly preferably 0.000001 mol/l to 0.01 mol/l halogenide ions and most preferably between 0.00001 mol/l and 0.001 mol/l halogenide ions. The halogenide ions are preferably bromide or/and chloride ions and particularly preferably bromide ions.

The gas mixture used in the process according to the present invention preferably contains no more than 20% by volume hydrogen. Furthermore the reaction is preferably carried out at an increased pressure, particularly preferably at a total pressure of at least 10 bar and most preferably at a total pressure of 40 to 200 bar.

The reaction temperature is generally between 0° and 100° C. and preferably between 15° and 70° C. Furthermore the reaction medium should preferably contain up to 2 mol/l, particularly preferably 0.001 mol/l to 0.5 mol/l of an acid which should preferably not be a hydrohalic acid. This acid is preferably a strong inorganic acid for example sulphuric acid or/and phosphoric acid.

If a palladium/iridium or palladium/rhodium bimetal is used as the catalyst then the content of iridium or rhodium is preferably 3 to 10 atom %. If on the other hand a palladium/gold alloy is used as the catalyst the gold content is preferably 5 to 80 atom %, particularly preferably 10 to 50 atom % and most preferably 20 to 50 atom %.

The catalyst can be present in the form of a finely dispersed metal powder as well as bound to a solid supporting material. A catalyst in the form of finely dispersed metal powder is preferably produced by reducing a palladium halogenide and a gold, iridium or rhodium halogenide in the desired ratios to one another in an aqueous solution using a suitable reducing agent, in particular sodium borohydride, and subsequently removing the halogenide ions from the aqueous solution.

If a catalyst is used that is present bound to a solid supporting material then the proportion of catalytically active metal is preferably 0.1 to 10% by weight particularly preferably 0.5 to 5% by weight and most preferably 1 to 3% by weight relative to the total weight of metal and supporting material. The supporting material is preferably a hydrophilic material which is selected from the group comprising active charcoal, materials based on silicic acid (e.g. silica gel, hydrous silicic acid), silicon carbide, zeolites, titanium dioxide, zirconium dioxide and aluminium oxide. Aluminium oxide is particularly preferably used as the supporting material. The production of the catalyst bound to a support is preferably carried out by reduction of a palladium halogenide and of a gold, iridium or rhodium halogenide in the desired ratio to one another in aqueous solution and in the presence of the appropriate amounts of supporting material using a reducing agent, in particular a formate, and subsequently removing the halogenide ions from the solution.

A preferred catalyst within the scope of the invention consists of a palladium-gold alloy with a content of 10 to 30 atom % gold on an aluminium oxide support. The amount of alloy is preferably 0.5 to 5, particularly preferably 0.1 to 3% by weight in relation to the total weight of the catalyst.

A particularly suitable catalyst for the present invention can be produced by mixing a hydrochloric acid solution of palladium chloride and gold chloride in the desired ratio of palladium:gold with the corresponding amount of supporting material, preferably aluminium oxide, at a weakly acidic pH value, advantageously between pH 5 and 6.5, heating, adding a reducing agent, in particular a formate, in excess and removing the chloride ions after the reduction is completed. It is expedient to carry out the heating at a weakly acidic pH value at temperatures between 50° and 90° C.; the reduction is likewise carried out at an increased temperature up to the boiling temperature.

Surprisingly by using the catalysts according to the present invention, an increase in the rate of formation, selectivity or/and yield of hydrogen peroxide can be achieved compared to the usual palladium catalysts.

The process according to the present invention can be carried out semi-continuously e.g. in a stirred autoclave which contains the liquid aqueous reaction medium whereby the gas mixture containing oxygen and hydrogen is passed through while stirring. In this process the temperature, pressure and flow-rate of the gases are monitored accordingly and adjusted accordingly. The process according to the present invention can also be carried out in a continuous manner using appropriate equipment.

The following examples serve to further elucidate the present invention.

EXAMPLES 1 to 11

8.4 mg of a commercially available palladium/gold supported catalyst which is coated with 5% by weight total metal on active charcoal Da 32/4 (Heraeus GmbH) was fed into a 500 ml stirred autoclave lined with Teflon and suspended in 115 g 0.05 molar sulphuric acid which contained 0.000068 mol/l sodium bromide.

The autoclave was closed and pressurized with 10 bar oxygen. The oxygen was subsequently discharged. This procedure was repeated twice in order to remove residual nitrogen from the autoclave. Afterwards 80 bar oxygen was applied and the temperature was held constant at 25° C. After the target temperature had been reached, 0.177 Nl/min oxygen and 0.0345 Nl/min hydrogen were passed through while stirring. The total pressure of 80 bar was kept constant using a pressure regulator. The reaction time was 177 min.

The amount of hydrogen consumed per hour and gram palladium and the selectivity were determined by the increase in weight after completion of the reaction and the amount of hydrogen peroxide formed was determined by titration with a 0.1 n cerium sulfate solution.

The amount of converted hydrogen was calculated as follows:

Mass $H_2O_2$= titrated mole $H_2O_2 \times 34$ mole $H_2O$= (increase in weight—mass $H_2O_2$)/18 converted mole $H_2$= mole $H_2O_2$—mole $H_2O$ converted mole $H_2$/(hxgPa)=converted mole $H_2 \times 60$ (reaction time xgPd)

The selectivity was calculated as follows:
S= titrated mole $H_2O_2$/reacted mole $H_2$

TABLE 1

| Example No. | Catalyst % Pd/% Au | Converted mole $H_2$(hxgPd) mole/(hxgPd) | Bound mole $H_2O_2$/(hxgPd) mole/(hxgPd) | Selectivity % |
|---|---|---|---|---|
| 1 | 5/— | 32.4 | 20.8 | 64 |
| 2 | 4.5/0.5 | 36.0 | 22.7 | 63 |
| 3 | 4.25/0.75 | 31.6 | 17.7 | 56 |
| 4 | 4.0/1.0 | 37.4 | 24.0 | 64 |
| 5 | 3.5/1.5 | 51.7 | 33.1 | 64 |
| 6 | 3.0/2.0 | 48.3 | 30.9 | 64 |
| 7 | 2.5/2.5 | 81.5 | 49.7 | 61 |
| 8 | 2.0/3.0 | 61.4 | 32.6 | 53 |
| 9 | 1.0/4.0 | 99.7 | 47.8 | 48 |
| 10 | 0.5/4.5 | 73.9 | 29.5 | 40 |
| 11 | —/5.0 | 0 | 0 | — |

EXAMPLES 12 to 16

The reaction was carried out as described in examples 1 to 11. However, the total pressure was lowered to 60 bar and the reaction time was decreased to 159 min.

TABLE 2

| Example No. | Catalyst % Pd/% Au | Converted mole $H_2$(hxgPd) mole/(hxgPd) | Bound mole $H_2O_2$/(hxgPd) mole/(hxgPd) | Selectivity % |
|---|---|---|---|---|
| 12 | 5.0/— | 36.4 | 26.9 | 74 |
| 13 | 4.25/0.75 | 41.5 | 29.0 | 70 |
| 14 | 3.5/1.5 | 40.5 | 30.3 | 75 |
| 15 | 2.5/2.5 | 51.9 | 38.9 | 75 |
| 16 | 1.0/4.0 | 136.2 | 99.5 | 73 |

EXAMPLES 17 to 20

The reaction was carried out as described in examples 1 to 11 except that the total pressure was 40 bar and the reaction time was 159 min.

TABLE 3

| Example No. | Catalyst % Pd/% Au | Converted mole $H_2$(hxgPd) mole/(hxgPd) | Bound mole $H_2O_2$/(hxgPd) mole/(hxgPd) | Selectivity % |
|---|---|---|---|---|
| 17 | 4.25/0.75 | 28.2 | 19.7 | 70 |
| 18 | 3.5/1.5 | 32.6 | 23.8 | 73 |
| 19 | 2.5/2.5 | 58.4 | 40.9 | 70 |
| 20 | 1.0/4.0 | 110.4 | 77.3 | 70 |

EXAMPLES 21 to 25

The reaction was carried out as described in examples to 11 except that the temperature was 10° C., 17.5 mg catalyst was added and the reaction time was increased to 248 min.

TABLE 4

| Example No. | Catalyst % Pd/% Au | Converted mole $H_2$(hxgPd) mole/(hxgPd) | Bound mole $H_2O_2$/(hxgPd) mole/(hxgPd) | Selectivity % |
|---|---|---|---|---|
| 21 | 5.0/— | 22.2 | 15.5 | 70 |
| 22 | 4.25/0.75 | 25.4 | 17.9 | 70 |
| 23 | 3.5/1.5 | 25.9 | 18.9 | 73 |
| 24 | 2.5/2.5 | 42.2 | 27.4 | 64 |
| 25 | 1.0/4.0 | 73.7 | 47.2 | 64 |

EXAMPLES 26 to 30

The reaction was carried out as described in examples 21 to 25 except that the sodium bromide concentration was 0.000165 mol/l.

TABLE 5

| Example No. | Catalyst % Pd/% Au | Converted mole $H_2$(hxgPd) mole/(hxgPd) | Bound mole $H_2O_2$/(hxgPd) mole/(hxgPd) | Selectivity % |
|---|---|---|---|---|
| 26 | 5.0/— | 22.1 | 14.8 | 67 |
| 27 | 4.25/0.75 | 34.5 | 21.0 | 61 |
| 28 | 3.5/1.5 | 30.9 | 19.7 | 64 |
| 29 | 2.5/2.5 | 32.9 | 21.4 | 65 |
| 30 | 1.0/4.0 | 79.1 | 49.8 | 63 |

EXAMPLES 31 to 38

40 mg palladium/gold-supported catalyst was fed into a 300 ml stirred autoclave and suspended in 40 ml 1.6 molar phosphoric acid which contained 0.0006 mol/l sodium bromide. The stirred liquid reaction mixture was held at a temperature of 25° C. and a gas mixture stream containing 4.5% hydrogen and 95.5% oxygen was passed through. The gas flow was 100 Nl/h, the pressure was 80 bar and the reaction time 120 min. The experiments were evaluated analogously to examples 1–30 via titration of hydrogen peroxide and increase in weight at the end of the reaction.

TABLE 6

| Example No. | Catalyst % Pd/% Au | Converted mole $H_2$(hxgPd) mole/(hxgPd) | Bound mole $H_2O_2$/(hxgPd) mole/(hxgPd) | Selectivity % |
|---|---|---|---|---|
| 31 | 5/— | 22.5 | 14.2 | 63 |
| 32 | 4.5/0.5 | 22.2 | 15.6 | 70 |
| 33 | 4.25/0.75 | 22.4 | 15.6 | 70 |
| 34 | 4.0/1.0 | 24.4 | 17.0 | 70 |
| 35 | 3.5/1.5 | 27.1 | 19.5 | 72 |
| 36 | 3.0/2.0 | 29.2 | 20.7 | 71 |
| 37 | 2.5/2.5 | 31.0 | 21.7 | 70 |
| 38 | 2.0/3.0 | 30.0 | 19.2 | 64 |

EXAMPLES 39 to 42

A) Process for the production of the catalysts

The catalyst used was a preparation obtained by applying a 2% by weight alloy consisting of palladium and gold onto a support of aluminium oxide.

The catalyst was produced in the following manner: A fine powder of aluminium oxide was added to a solution which had been obtained by dissolving a certain amount palladium chloride and gold chloride in aqueous 0.1N hydrochloric acid in such an amount that the total amount of metallic palladium and gold was 2% by weight in relation to aluminium oxide and the ratios of palladium to gold were 50, 30 and 10 atom % gold. The suspension was stirred and the pH value was adjusted to 6 by means of 10% by weight sodium hydroxide solution and subsequently heated to 80° C. An aqueous sodium formate solution which was prepared from 15 g sodium formate and 85 g deionized water was added to this solution in such an amount that the molar ratio of sodium formate to palladium was 40. The suspension was heated to boiling and 5 min after completion of the reduction it was slowly cooled. The catalyst was filtered off, washed with deionized water until free of chloride and dried for 10 hours in a vacuum at 100° C.

B) $H_2O_2$ synthesis 40 mg of a palladium/gold supported catalyst obtained according to A) which is coated with 2% by weight total metal on aluminium oxide was added to a 500 ml stirred autoclave lined with Teflon and suspended in 160 g 0.05 molar sulphuric acid which contained 0.00003 mol/l sodium bromide.

The autoclave was closed and pressurized with 10 bar oxygen. The oxygen was subsequently discharged. This procedure was repeated twice in order to remove residual nitrogen from the autoclave. Afterwards 80 bar oxygen was applied and the temperature was held constant at 25° C. As soon as the target temperature had been reached, 0.168 Nl/min oxygen and 0.03365 Nl/min hydrogen were passed through while stirring. The total pressure of 80 bar was kept constant using a pressure regulator. The reaction time was 600 min.

TABLE 7

| Example No. | Catalyst at % Pd/ at % Au | Converted mole $H_2$(h*gPd) mole/(h*gPd) | Bound mole $H_2O_2$/(h*gPd) mole/(h*gPd) | Selectivity % |
|---|---|---|---|---|
| 39 | 100/— | 28.9 | 11.9 | 41 |
| 40 | 90/10 | 42.9 | 16.7 | 39 |
| 41 | 70/30 | 77.8 | 35.8 | 46 |
| 42 | 50/50 | 117.5 | 50.5 | 43 |

EXAMPLES 413 to 44

The reaction was carried out as described in examples 39 to 42, however, the total pressure was lowered to 40 bar.

TABLE 8

| Example No. | Catalyst at % Pd/ at % Au | Converted mole $H_2$(h*gPd) mole/(h*gPd) | Bound mole $H_2O_2$/(h*gPd) mole/(h*gPd) | Selectivity % |
|---|---|---|---|---|
| 43 | 100/— | 26.3 | 9.7 | 37 |
| 44 | 50/50 | 89.3 | 26.8 | 30 |

EXAMPLES 45 to 46

The reaction was carried out as described in examples 39 to 42, however, the total pressure was lowered to 20 bar.

TABLE 9

| Example No. | Catalyst at % Pd/ at % Au | Converted mole $H_2$(h*gPd) mole/(h*gPd) | Bound mole $H_2O_2$/(h*gPd) mole/(h*gPd) | Selectivity % |
|---|---|---|---|---|
| 45 | 100/— | 15.5 | 5.6 | 36 |
| 46 | 50/50 | 63.1 | 19.6 | 31 |

EXAMPLES 47 to 48

The reaction was carried out as described in examples to 4, however, the hydrogen stream was lowered to 0.02356 Nl/h.

TABLE 10

| Example No. | Catalyst at % Pd/ at % Au | Converted mole $H_2$(h*gPd) mole/(h*gPd) | Bound mole $H_2O_2$/(h*gPd) mole/(h*gPd) | Selectivity % |
|---|---|---|---|---|
| 47 | 100/— | 22.4 | 10.8 | 48 |
| 48 | 90/10 | 83.0 | 26.8 | 40 |

EXAMPLES 49 to 50

The reaction was carried out as described in examples 1 to 4, however, the hydrogen stream was lowered to 0.01346 Nl/h.

TABLE 11

| Example No. | Catalyst at % Pd/ at % Au | Converted mole $H_2$(h*gPd) mole/(h*gPd) | Bound mole $H_2O_2$/(h*gPd) mole/(h*gPd) | Selectivity % |
|---|---|---|---|---|
| 49 | 100/— | 16.3 | 8.2 | 50 |
| 50 | 90/10 | 47.7 | 23.4 | 49 |

EXAMPLE 51

Production of a palladium/iridium catalyst bound to a support.

A fine powder of aluminium oxide was added to a solution which had been obtained by dissolving palladium chloride and iridium chloride in aqueous 0.1N hydrochloric acid so that the total amount of metallic palladium and iridium was 2% by weight relative to aluminium oxide and the ratio of palladium to iridium was between 3 and 10 atom % iridium. The suspension was stirred, the pH adjusted to 6 with 10% by weight sodium hydroxide solution and subsequently heated to 80° C. An aqueous sodium formate solution which was prepared from 15 g sodium formate and 85 g deionized water was added to this solution in such an amount that the molar ratio of sodium formate to palladium was 40:1. The suspension was heated to boiling and 5 minutes after completion of the reduction it was slowly cooled. The catalyst was filtered off, washed with deionized water until free of chloride and dried for 10 hours in a vacuum at 100° C.

EXAMPLE 52

Production of palladium/gold, palladium/iridium, palladium/rhodium catalysts in a finely dispersed form.

Precipitates obtained by common reduction of their chlorides from the solution were used as catalysts. The catalyst was prepared in the following manner. The chlorides of the metals to be reduced were mixed in the amounts that corresponded to the composition of the catalyst to be prepared. The mixed salts were dissolved in ca. 50 ml ca. 1 mol/l hydrochloric acid per g catalyst and added dropwise at a rate of 1 ml/sec into 66 ml of an aqueous reduction solution per g catalyst that was heated to 80° C. and stirred and which contained 8% by weight sodium hydroxide and 5% by weight sodium borohydride. The reduction was carried out in a suitable glass apparatus consisting of a round-bottom flask with an attached reflux condenser, thermometer, stirring apparatus and dropping funnel. The preparations obtained in this manner were filtered, washed to neutrality with deionized water and dried in a vacuum at 100° C. The dried preparations were subsequently subjected to a hydrogen stream of 1 Nm$^3$/h for 1 h at 240° C.

EXAMPLES 53 to 56

40 mg of a palladium/iridium bimetal supported catalyst which was coated with 2% by weight total metal on aluminium oxide and prepared according to example 51 was fed into a 500 ml stirred autoclave lined with Teflon and suspended in 150 g 0.05 M sulphuric acid which contained 0.00003 mol/l sodium bromide.

The autoclave was closed and pressurized with 10 bar oxygen. The oxygen was subsequently discharged. This procedure was repeated twice in order to remove residual nitrogen from the autoclave. Afterwards 80 bar oxygen was applied and the temperature was held constant at 25° C. After the target temperature had been reached, 0.168 Nl/min oxygen and 0.03365 Nl/min hydrogen were passed through while stirring. The total pressure of 80 bar was kept constant using a pressure regulator. The reaction time was 600 min.

The amount of hydrogen consumed per hour and gram palladium (H$_2$/(h*gPd)) and the selectivity were determined by the increase in weight after completion of the reaction and the amount of hydrogen peroxide formed per hour and gram palladium (H$_2$/(h*gPd)) was determined by titration with a 0.1 n cerium sulfate solution.

The amount of converted hydrogen was calculated as follows:

Mass H$_2$O$_2$= titrated mole H$_2$O$_2$* 34
mole H$_2$O= (increase in weight—mass H$_2$O$_2$)/18
converted mole H$_2$= mole H$_2$O$_2$—mole H$_2$O
converted mole H$_2$/(h*gPd)=converted mole H$_2$+60/(reaction time *gPd)

The selectivity was calculated as follows:
S= titrated mole H$_2$O$_2$/converted mole H$_2$

TABLE 12

| Example No. | Catalyst at % Pd/ at % Ir | Converted mole H$_2$(h*gPd) mole/(h*gPd) | Bound mole H$_2$O$_2$/(h*gPd) mole/(h*gPd) | Selectivity % |
| --- | --- | --- | --- | --- |
| 53 | 100/— | 28.9 | 11.9 | 41 |
| 54 | 95/5 | 44.8 | 22.0 | 49 |
| 55 | 92.3/7.7 | 62.7 | 25.1 | 40 |
| 56 | 0/100 | 0 | 0 | — |

EXAMPLES 57 to 58

The reaction was carried out analogous to the process described in examples 53 to 56, however, the total pressure in the autoclave was lowered to 40 bar.

TABLE 13

| Example No. | Catalyst at % Pd/ at % Ir | Converted mole H$_2$(h*gPd) mole/(h*gPd) | Bound mole H$_2$O$_2$/(h*gPd) mole/(h*gPd) | Selectivity % |
| --- | --- | --- | --- | --- |
| 57 | 100/— | 26.3 | 9.7 | 37 |
| 58 | 92.3/7.7 | 45.8 | 17.9 | 39 |

EXAMPLES 59 to 60

The reaction was carried out analogous to the process described in examples 53 to 56, however, the total pressure in the autoclave was lowered to 20 bar.

TABLE 14

| Example No. | Catalyst at % Pd/ at % Ir | Converted mole H$_2$(h*gPd) mole/(h*gPd) | Bound mole H$_2$O$_2$/(h*gPd) mole/(h*gPd) | Selectivity % |
| --- | --- | --- | --- | --- |
| 59 | 100/— | 15.5 | 5.6 | 36 |
| 60 | 92.3/7.7 | 33.5 | 10.7 | 32 |

EXAMPLES 61 to 62

The reaction was carried out analogous to the process described in examples 53 to 56, however, the hydrogen stream was lowered to 0.02356 Nl/h.

TABLE 15

| Example No. | Catalyst at % Pd/ at % Ir | Converted mole H$_2$(h*gPd) mole/(h*gPd) | Bound mole H$_2$O$_2$/(h*gPd) mole/(h*gPd) | Selectivity % |
| --- | --- | --- | --- | --- |
| 61 | 100/— | 22.4 | 10.8 | 48 |
| 62 | 92.3/7.7 | 34.8 | 17.1 | 49 |

EXAMPLES 63 to 64

The reaction was carried out analogous to the process as described in examples 53 to 56, however, the hydrogen stream was lowered to 0.01346 Nl/h.

TABLE 16

| Example No. | Catalyst at % Pd/ at % Ir | Converted mole H$_2$(h*gPd) mole/(h*gPd) | Bound mole H$_2$O$_2$/(h*gPd) mole/(h*gPd) | Selectivity % |
| --- | --- | --- | --- | --- |
| 63 | 100/— | 16.3 | 8.2 | 50 |
| 64 | 92.3/7.7 | 21.3 | 10.2 | 48 |

EXAMPLES 65 to 77

100 mg of a palladium/gold, palladium/iridium or palladium/rhodium catalyst prepared according to example 52 was fed into a 500 ml stirred autoclave lined with Teflon and suspended in 160 g 0.05 M sulphuric acid which contained 0.001 mol/l sodium bromide.

The autoclave was closed and pressurized with 10 bar oxygen. The oxygen was subsequently discharged. This procedure was repeated twice in order to remove residual nitrogen from the autoclave. Afterwards 40 bar oxygen was applied and the temperature was held constant at 25° C. After the target temperature had been reached, 0.168 Nl/min oxygen and 0.01346 Nl/min hydrogen were passed through while stirring. The total pressure of 40 bar was kept constant using a pressure regulator. The reaction time was 177 min.

The amount of hydrogen consumed per hour and gram palladium, the selectivity and the amount of hydrogen peroxide formed per hour and gram palladium were determined as in example 53.

TABLE 17

| Example No. | Catalyst at % Pd/ at % (Rh, Ir or Au) | Converted mole H$_2$(h*gPd) mole/(h*gPd) | Bound mole H$_2$O$_2$/(h*gPd) mole/(h*gPd) | Selectivity % |
| --- | --- | --- | --- | --- |
| 65 | 100/— | 0.130 | 0.048 | 37 |
| 66 | —/100 Rh | 0 | 0 | — |

TABLE 17-continued

| Example No. | Catalyst at % Pd/ at % (Rh, Ir or Au) | Converted mole H₂(h*gPd) mole/(h*gPd) | Bound mole H₂O₂/(h*gPd) mole/(h*gPd) | Selectivity % |
|---|---|---|---|---|
| 67 | —/100 Ir | 0 | 0 | — |
| 68 | —/100 Au | 0 | 0 | — |
| 69 | 95/5 Rh | 0.124 | 0.055 | 45 |
| 70 | 90/10 Rh | 0.247 | 0.099 | 40 |
| 71 | 95/5 Ir | 0.169 | 0.106 | 63 |
| 72 | 90/10 Ir | 0.261 | 0.071 | 27 |
| 73 | 95/5 Au | 0.149 | 0.060 | 40 |
| 74 | 90/10 Au | 0.175 | 0.077 | 44 |
| 75 | 80/20 Au | 0.220 | 0.105 | 48 |
| 76 | 70/30 Au | 0.288 | 0.153 | 53 |
| 77 | 50/50 Au | 0.334 | 0.167 | 50 |

EXAMPLES 78 to 82

The reaction was carried out analogous to the process described in examples 65 to 77 except that the amount of catalyst used was reduced to 40 mg and the sodium bromide concentration was reduced to 0.000147 mol/l.

TABLE 18

| Example No. | Catalyst at % Pd/ at % (Rh, Ir or Au) | Converted mole H₂(h*gPd) mole/(h*gPd) | Bound mole H₂O₂/(h*gPd) mole/(h*gPd) | Selectivity % |
|---|---|---|---|---|
| 78 | 100/— | 0.178 | 0.071 | 40 |
| 79 | 95/5 Ir | 0.289 | 0.191 | 66 |
| 80 | 90/10 Rh | 0.493 | 0.281 | 57 |
| 81 | 90/10 Au | 0.271 | 0.146 | 54 |
| 82 | 50/50 Au | 0.557 | 0.306 | 55 |

EXAMPLES 83 to 87

The reaction was carried out analogous to the process described in examples 65 to 77 except that the amount of catalyst used was reduced to 40 mg and the sodium bromide concentration was reduced to 0.000027 mol/l.

TABLE 19

| Example No. | Catalyst at % Pd/ at % (Rh, Ir or Au) | Converted mole H₂(h*gPd) mole/(h*gPd) | Bound mole H₂O₂/(h*gPd) mole/(h*gPd) | Selectivity % |
|---|---|---|---|---|
| 83 | 100/— | 0.210 | 0.074 | 36 |
| 84 | 90/10 Rh | 0.616 | 0.148 | 24 |
| 85 | 95/5 Au | 0.243 | 0.134 | 55 |
| 86 | 90/10 Au | 0.286 | 0.157 | 55 |
| 87 | 50/50 Au | 0.581 | 0.308 | 53 |

EXAMPLES 88 to 91

The reaction was carried out analogous to the process described in examples 65 to 77 except that the amount of catalyst used was 40 mg, the sodium bromide concentration was reduced to 0.000147 mol/l, the total pressure was 60 bar and the reaction time was 10 hours.

TABLE 20

| Example No. | Catalyst at % Pd/ at % (Rh, Ir or Au) | Converted mole H₂(h*gPd) mole/(h*gPd) | Bound mole H₂O₂/(h*gPd) mole/(h*gPd) | Selectivity % |
|---|---|---|---|---|
| 88 | 100/— | 0.361 | 0.135 | 37 |
| 89 | 95/5 Ir | 0.545 | 0.262 | 48 |
| 90 | 90/10 Au | 0.557 | 0.195 | 35 |
| 91 | 50/50 Au | 1.173 | 0.422 | 36 |

EXAMPLES 92 to 96

The reaction was carried out analogous to the process described in examples 65 to 77 except that the amount of catalyst used was 40 mg, the sodium bromide concentration was reduced to 0.000147 mol/l, the total pressure was 80 bar and the reaction time was 10 hours.

TABLE 21

| Example No. | Catalyst at % Pd/ at % (Rh, Ir or Au) | Converted mole H₂(h*gPd) mole/(h*gPd) | Bound mole H₂O₂/(h*gPd) mole/(h*gPd) | Selectivity % |
|---|---|---|---|---|
| 92 | 100/— | 0.507 | 0.187 | 37 |
| 93 | 95/5 Ir | 0.639 | 0.269 | 42 |
| 94 | 90/10 Au | 0.602 | 0.259 | 43 |
| 95 | 70/30 Au | 1.053 | 0.400 | 38 |
| 96 | 50/50 Au | 1.465 | 0.586 | 40 |

We claim:

1. Process for the production of hydrogen peroxide comprising:

forming a substantially nitrogen free gas mixture comprising hydrogen and oxygen;

forming a substantially chloride free aqueous reaction mixture containing:

less than 2% by volume liquid organic components, and sodium bromide in an amount sufficient to provide at least about 0.00001 mol per liter bromide ions and at most 0.01 mol per liter halogen ions; and mixing a halogenide of palladium with a halogenide of at least one member of the group consisting of iridium and rhodium to form a halogenide bimetal of palladium and 1 to 15 percent of at least one member selected from the group consisting of iridium and rhodium;

reducing said mixture of a halogenide of palladium and a halogenide of at least one member selected from the group consisting of iridium and rhodium, with a non-hydrogen producing reducing agent consisting essentially of sodium formate to form a reduced bimetallic catalyst comprising palladium and 1 to 15 weight percent of at least one metal selected from the group consisting of iridium and rhodium;

admixing said reduced bimetallic catalyst into said aqueous reaction mixture;

passing said gas mixture through said aqueous reaction mixture; and contacting said gas mixture, in said aqueous reaction mixture, with said reduced bimetallic catalyst under conditions sufficient to convert hydrogen and oxygen in said gas mixture into hydrogen peroxide.

2. Process as claimed in claim 1 wherein the reaction medium contains 0.00001 mol/l to 0.001 mol/l halogenide bromide ions.

3. Process as claimed in claim 1, wherein said palladium/ iridium or palladium/rhodium bimetal contain 3 to 10 atom percent iridium or rhodium respectively.

4. Process as claimed in claim 1, wherein said palladium/ gold alloy contains 10 to 50 atom percent gold.

5. Process as claimed in claim 1, wherein said gas mixture contains up to 20% by volume hydrogen.

6. Process as claimed in claim 1 wherein the total pressure during the reaction is at least 10 bar.

7. Process as claimed in claim 6, wherein the total pressure is 40 to 200 bar.

8. Process as claimed in claim 1, wherein the reaction temperature is in the range of 15° to 70° C.

9. Process as claimed in claim 1, wherein the reaction medium contains up to 2 mol/l of a non-halogenated acid.

10. Process as claimed in claim 9, wherein said acid is present in a concentration of about 0.001 mol/l to 0.5 mol/l.

11. Process as claimed in claim 9, wherein the acid is phosphoric acid and/or sulphuric acid.

12. Process as claimed in claim 1, wherein the reaction medium contains less than 0.5% by volume liquid organic components.

13. Process as claimed in claim 1, wherein the catalyst is present in the form of a finely dispersed metal powder.

14. Process as claimed in claim 1, wherein the catalyst is present bound to a solid supporting material.

15. Process as claimed in claim 14, wherein the supporting material is selected from the group consisting of active charcoal, silicon carbide, zeolites, titanium dioxide, zirconium dioxide, aluminum oxide and materials based on silicic acid.

16. Process as claimed in claim 15, wherein a supporting material of aluminium oxide is used.

17. Process as claimed in claim 14 wherein the proportion of catalytically active metal is 0.1 to 10% by weight in relation to the total weight of metal and supporting material.

18. Process as claimed in claim 14 wherein said catalyst has been produced by reducing said palladium halogenide and an iridium or rhodium, respectively, halogenide, in the set forth ratios to one another, in said aqueous solution in effective contact with a sufficient amount of a supporting material and said reducing agent comprising sodium formate under reducing conditions.

19. Process as claimed in claim 14, wherein a palladium/ gold alloy with a content of 9 to 95 atom % gold on a solid support is used.

20. Process as claimed in claim 19, wherein the solid support is carbon.

21. Process as claimed in claim 19, wherein said catalyst comprises a palladium/gold alloy, comprising 10 to 50 atom % gold, on an aluminium oxide support.

22. Process as claimed in claim 21, wherein said catalyst is produced by mixing a hydrochloric acid solution of Pd chloride and Au chloride in the set forth ratio of Pd: Au with the set forth amount of aluminium oxide, heating said mixture at said non-hydrogen producing weekly acidic pH value, adding an excess of a reducing agent comprising sodium formate maintaining reducing condition, and removing chloride ions after the reduction.

23. A process as claimed in claim 1 wherein said aqueous reaction mixture contains less than 0.5% by volume liquid organic components.

24. A process as claimed in claim 1 wherein said aqueous reaction mixture is free of analyzable liquid organic components.

25. Process for the production of hydrogen peroxide comprising:

forming a substantially nitrogen free gas mixture comprising hydrogen and oxygen;

forming a substantially chloride free aqueous reaction mixture containing:

less than 2% by volume liquid organic components, and sodium bromide in an amount sufficient to provide at least about 0.000001 mol per liter bromide ions and at most 0.01 mol per liter halogen ions; and mixing a halogenide of palladium with a halogenide of gold to form a halogenide bimetal of palladium and 5 to 95 percent gold;

reducing said mixture of a halogenide of palladium and a halogenide of gold with a non-hydrogen producing reducing agent consisting essentially of sodium formate to form a reduced bimetallic catalyst comprising palladium and 1 to 15 weight percent of gold;

admixing said reduced bimetallic catalyst into said aqueous reaction mixture;

passing said gas mixture through said aqueous reaction mixture; and contacting said gas mixture in said aqueous reaction mixture with said reduced bimetallic catalyst under conditions sufficient to convert hydrogen and oxygen in said gas mixture into hydrogen peroxide.

26. Process as claimed in claim 25 wherein said bimetal catalyst is in the form of a finely dispersed powder, and wherein after said catalyst has been produced by a reduction of said palladium halogenide and a gold halogenide in an aqueous solution containing said sodium formate reducing agent;

removing halogen ions produced by said reduction to produce a substantially halogen free metallic powder; and then combining said reduced, substantially halogen free metallic powder with said aqueous reaction mixture.

* * * * *

UNITED STATES PATENT AND TRADEMARK OFFICE
CERTIFICATE OF CORRECTION

PATENT NO. : 5,505,921
DATED : April 21, 1997
INVENTOR(S) : LÜCKOFF et al.

It is certified that error appears in the above-indentified patent and that said Letters Patent is hereby corrected as shown below:

On the title page:

Item [22], please delete "PCT Filed: Dec. 9, 1993" insert therefor --Filed: December 2, 1994--.

Item [86], please delete in it's entirety.

Signed and Sealed this

Twentieth Day of May, 1997

*Attest:*

BRUCE LEHMAN

*Attesting Officer*     *Commissioner of Patents and Trademarks*